May 6, 1952  J. P. STRANGE ET AL  2,595,311
AUTOMATIC MULTIPLE SAMPLING VALVE
Filed June 5, 1947  3 Sheets-Sheet 1
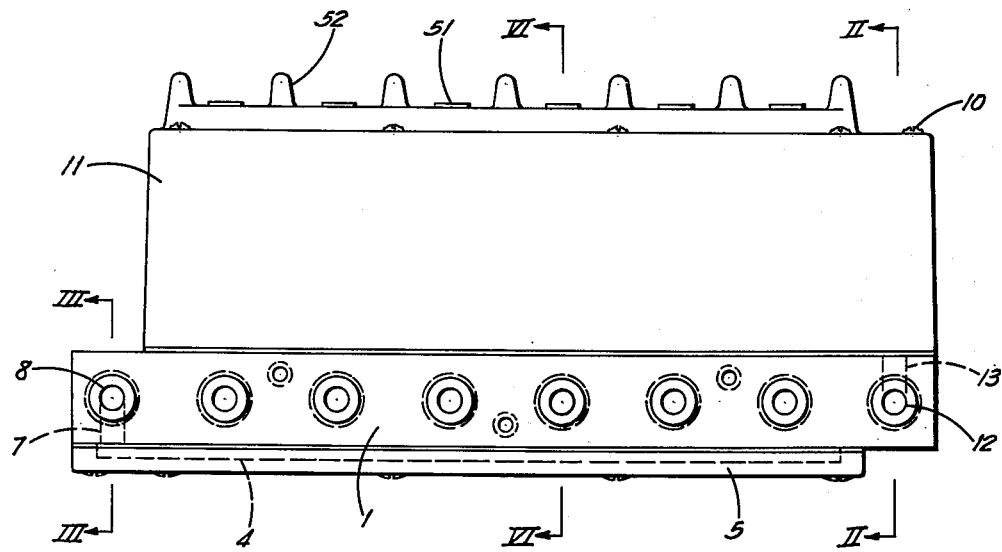
Fig.1
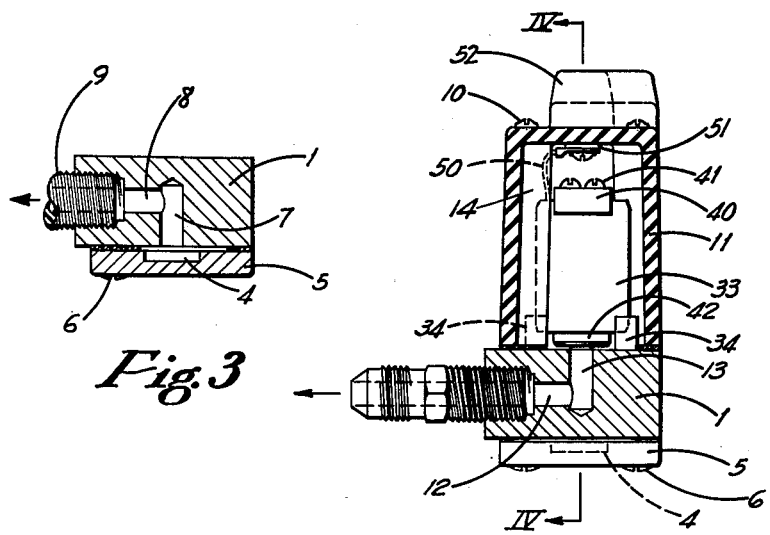
Fig.3
Fig.2
Inventors
John P. Strange
William P. Yant
By Brown, Critchlow, Hick & Peckham
their Attorneys May 6, 1952 J. P. STRANGE ET AL 2,595,311
AUTOMATIC MULTIPLE SAMPLING VALVE
Filed June 5, 1947 3 Sheets-Sheet 3

Inventors
John P. Strange
William P. Yant
By Brown, Critchlow, Flick & Peckham
their Attorneys Patented May 6, 1952

2,595,311

UNITED STATES PATENT OFFICE 2,595,311

AUTOMATIC MULTIPLE SAMPLING VALVE

John P. Strange, Wilkinsburg, and William P. Yant, Murraysville, Pa., assignors to Mine Safety Appliances Company, Pittsburgh, Pa., a corporation of Pennsylvania Application June 5, 1947, Serial No. 752,780

7 Claims. (Cl. 137—144)

The invention relates to valves, and particularly to multiple sampling valves that constitute a unit of an assembly of apparatus in a system for analyzing samples of gases, especially air, taken periodically and usually successively from different localities, such as from several parts of an airplane fuselage, several furnaces, mine passages, floors of buildings, and the like.

An object of the invention is to provide a multiple sampling valve comprising a plurality of individual three-way valve units that are separately actuated to control the flow of one or another of several streams of gas to equipment for testing it, the valve being simple in construction, compact, and light in weight.

A further object is to provide a multiple sampling valve in which the movable part of each valve unit is independently actuated by a separate solenoid having an armature that is freely movable without being restrained by a stuffing box or other form of packing, and in which the several armatures and valve heads are the only movable parts of the structure.

A further object is to provide a multiple sampling valve whose several units are actuated by small solenoids that are enclosed in a chamber through which some of the streams of sample gas flow to cool the solenoids so that they will not become overheated by the electric currents that intermittently energize them.

Figure 4:
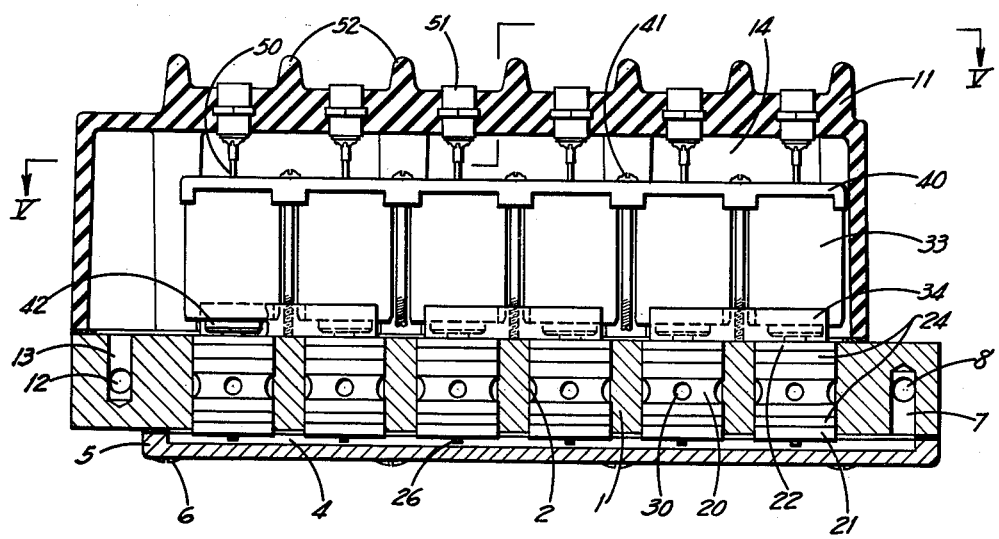
Figure 5:
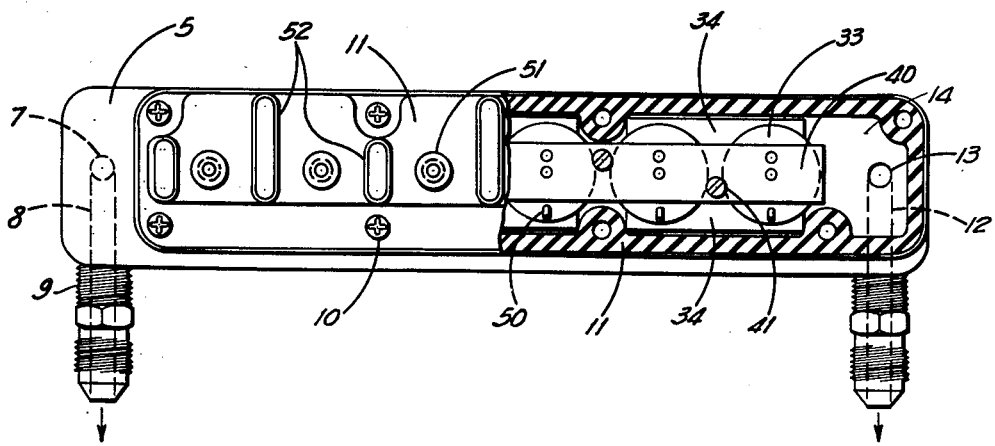

The invention is illustrated in the accompanying drawings, of which Fig. 1 is a full size side view of a multiple sampling valve; Figs. 2 and 3 vertical sectional views taken on the lines II—II and III—III, respectively, of Fig. 1; Fig. 4 a longitudinal central sectional view taken on the line IV—IV, Fig. 2; Fig. 5 a horizontal sectional and plan view taken on the broken line V—V, Fig. 4; and Fig. 6 a vertical central sectional view to enlarged scale of one of the valve units, the plane of view being indicated by the line VI—VI, Fig. 1.

The multiple sampling valve illustrated in the drawings is diagrammatically illustrated and its operation generally described in Patent No. 2,506,394 for a Multiple Sampling Valve Circuit, to John P. Strange, which issued May 2, 1950. The valve shown in the present application is constructed to control the flow of six streams of gas to a testing unit, and to that end is equipped with six separate and independently controlled valve units that are structurally the same. However, like multiple sampling valves may be provided with any desired number of units. The valve is illustrated in its normal upright or vertical position, and for convenience in description it will be explained as being in such position although in use it may be in any desired position.

The valve comprises a block 1 that is preferably formed of metal, such as aluminum, so that it can form a grounding conductor for solenoids presently to be described. Extending vertically through the block there are six openings 2, one for receiving each valve unit presently to be described, and, communicating with each such opening, the side of the block is provided with a horizontally disposed sample gas inlet 3 adapted to be connected to a conduit leading from one of the several sources of gas to be tested. The lower end of each block opening 2 communicates with a sample gas manifold 4 that extends longitudinally of the block and is preferably in the form of a channel formed in the top of a base 5 that may be attached to the bottom of the block by screws 6. At one of its ends block 1 is provided with a vertical passage 7, Fig. 3, that communicates at its lower end with channel 4 and at its upper end with a horizontal passage 8 that extends to an outlet 9 leading to suitable gas testing equipment.

Attached to the top of block 1, as by screws 10, there is a hood 11 which houses valve-operating units presently to be explained, and which forms a manifold 14 for the streams of gas that are periodically not being tested. Such streams then constitute exhaust gas that escapes through an exhaust gas port 12, Fig. 2, that is formed in one end of block 1 and communicates with the hood through a vertical opening 13 formed in the block.

As has been stated, each vertical opening 2 through block 1 is provided with a three-way valve unit that controls flow of sample gas from an inlet 3, either downwardly into manifold 4 or upwardly into the exhaust gas manifold 14 within hood 11. As shown particularly in Fig. 6, each valve unit preferably comprises a three-part housing consisting of a central barrel 20, a lower valve seat ring 21 and an upper valve seat ring 22. The upper end of each block opening 2 is provided with an inwardly extending abutment 23, which engages the top of valve seat ring 22 to position it and the valve unit of which it is a part in the opening.

Between the top and bottom of barrel 20 and outwardly extending flanges formed on valve seat rings 21 and 22, there are annular gaskets 24 that seal the opposite sides of the three-way valve. These gaskets may be formed of rubber rings of circular cross-section that are pressed outwardly into sealing engagement with the wall of opening 2. The pressure on the gaskets is produced by the attachment of base 5 to the bottom of block 1, the top of the base then engaging the lower face of valve seat ring 21 and pressing it upwardly to squeeze the gaskets into their sealing position shown in the drawing.

Within the three-part housing of each valve unit there is a valve head 25 which is attached to a stem 26 that is vertically movable in the manner presently to be explained. In the lower position of the valve head shown in Fig. 6, sample gas flowing through inlet 3 passes through openings 30 of barrel 20 into the interior of the valve casing and upwardly through ring 22 into the manifold 14 formed within hood 11. When valve stem 26 is moved upwardly to position its head 25 against the seat of ring 22, sample gas flows from inlet 3 downwardly through ring 21 into manifold 4.

Figure 6:
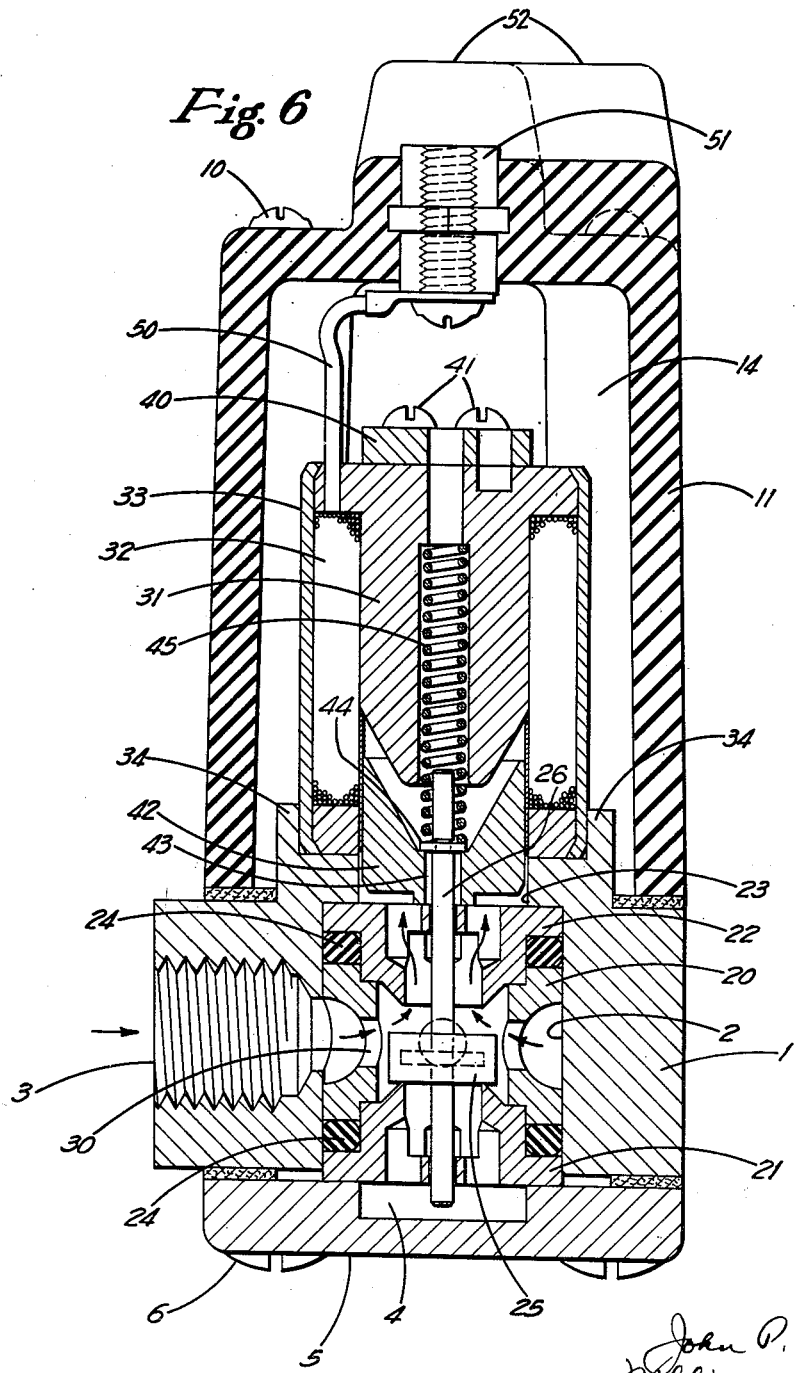

The positioning of each valve head 25 is controlled by a plurality of electromagnets in the form of solenoids that are mounted on the top of the block 2 within the hood, there being a separate solenoid for each valve unit. As shown in Fig. 6, each solenoid comprises a central core 31, a winding 32 around the core and a cylindrical casing 33 enclosing the winding. The bottom of each casing 33 rests upon the top of block 1 whose upper face is provided with a series of flanges 34 that have arcuate grooves for receiving the casings. Engaging the tops of the several solenoids there is a horizontal bar 40 which is attached to the top of block 1 by screws 41 positioned between the several solenoids.

Below the core 31 of each solenoid there is an armature 42 which is provided with a central opening 43 through which the upper end of valve stem 26 passes. Opening 43 is provided with a ledge that supports a shoulder 44 formed on stem 26. Bearing on the top of this shoulder there is a compression spring 45 whose upper end bears against a ledge formed in a central opening of core 31. This spring yieldingly urges the valve stem downwardly so that the head 25 attached to it closes the valve seat in ring 21, but when the valve is used in the vertical position shown in the drawings the weight of the stem and head attached to it may be relied upon to move the valve downwardly without the assistance of a spring. When the winding 32 of a solenoid is energized, armature 42 moves upwardly to cause valve head 25 to uncover the seat on ring 21 and to cover the seat on ring 22.

The winding 32 of each solenoid is connected by a conductor 50 to a conducting thimble 51 that extends through the top of hood 11 and to which there may be attached a conductor leading to the electrical control system of the multiple sampling valve. Separating the upper ends of connectors 51 from each other, the top of hood 41 is integrally provided with upwardly extending insulating fins 52. The other side of each core winding may be grounded on block 1.

In the operation of the multiple sampling valve, streams of sample gas normally flow through each of the several sample gas inlets 3 to the openings 2 that extend vertically through block 1. The three-way valves in all but one of these openings are normally in the position shown in Fig. 6, the valve heads then closing the seats on rings 21. Each stream of gas then not being tested flows upwardly through valve seat ring 22 to the space between its top and the bottom of armature 42, and then flows laterally into the manifold 14 within hood 11. This exhaust gas escapes from the manifold through opening 13 in one end of the block 1 which communicates with exhaust gas outlet 12. Such flow of several streams of exhaust gas so cools the windings 32 of the several solenoids that they do not become overheated by the electric current that intermittently energizes them.

Depending upon the particular stream of gas that is being tested, the electric control system energizes the winding 32 of the solenoid that controls the flow of gas of such stream, and when the solenoid is thus energized, armature 42 is moved upwardly against the resistance of spring 45 to cause valve head 25 to open the seat in ring 21 so that the stream of sampling gas to be tested flows downwardly into manifold 4, from which it flows through sample gas outlet 9 formed in block 1 beyond the end of hood 11. Normally the several solenoids are energized periodically to cause the gas entering the several inlets 3 thus to flow in sequence to manifold 4 and from it to suitable gas testing equipment.

The unit valves in the several block openings 2 may be readily removed and tested, or replaced if necessary, by simply removing base 5 from block 1. Each valve may then be removed as a unit by engaging the lower end of stem 26 and moving it outwardly of opening 2. Each unit thus removed consists of a three-part valve casing 20, 21 and 22, valve stem 26 and valve head 25 attached to it, and armature 42, and spring 45 associated with the valve. The valve unit may readily be assembled outside of the block and placed as a unit in an opening 2. There being no stuffing box or other packing restraining the movements of the valve stems, there is nothing to interfere with their free and unrestricted operation. The entire structure may therefore be made in compact and simple form.

According to the provisions of the patent statutes, we have explained the principle and operation of our invention and have illustrated and described what we now consider to be the best embodiment of it. However, we desire to have it understood that, within the scope of the appended claims, this invention may be practiced otherwise than as specifically illustrated and described.

We claim:

1. A multiple sampling valve, comprising a block provided with a plurality of openings extending therethrough, sample gas inlets communicating one with each of said openings, a sample gas outlet and a sample gas exhaust port; a base attached to a face of the block and forming therewith a sample gas manifold communicating with said outlet and with each of said openings at one end thereof, a hood attached to another face of the block and forming therewith a manifold communicating with said exhaust gas port and with each of the other ends of said openings, three-way valve structures positioned one in each of said openings and formed to place the sample gas inlet thereof in communication with one or the other of said manifolds, and a plurality of solenoids in said hood connected one to each of said three-way valve structures for actuating it, whereby exhaust gas flows through the hood in heat exchange relation with said solenoids.

2. A multiple sampling valve, comprising a block provided with a plurality of openings extending vertically therethrough, lateral sample gas inlets communicating one with each of said openings, a sample gas outlet and a sample gas exhaust port; a base attached to the bottom of the block and forming therewith a sample gas manifold communicating with said outlet and with each of the bottoms of said openings, a hood attached to the top of the block and forming therewith a manifold communicating with said exhaust gas port and with each of the tops of said openings, three-way valve structures positioned one in each of said openings and formed to place the sample gas inlet thereof in communication with one or the other of said manifolds, and a plurality of solenoids in said hood connected one to each of said three-way valve structures for actuating it, whereby exhaust gas flows through the hood in heat exchange relation with said solenoids.

3. A multiple sampling valve, comprising an elongate block provided with a plurality of spaced parallel openings extending vertically therethrough and arranged in a line, lateral sample gas inlets communicating one with each of said openings, a lateral sample gas outlet and a lateral sample gas exhaust port; a base attached to the bottom of the block and provided with a channel forming with said block a sample gas manifold communicating with said outlet and with each of the bottoms of said openings, a hood attached to the top of the block and forming therewith a manifold communicating with said exhaust gas port and with each of the tops of said openings, three-way valve structures removably positioned one in each of said openings and retained therein by said base, each of said valves being formed to place the sample gas inlet of one of said openings in communication with one or the other of said manifolds, and a plurality of solenoids in said hood connected one to each of said valve structures for actuating it, whereby exhaust gas flows through the hood in heat exchange relation with said solenoids.

4. A multiple sampling valve, comprising a block provided with a plurality of openings extending vertically therethrough, lateral sample gas inlets communicating one with each of said openings, a sample gas outlet and a sample gas exhaust port; a base attached to the bottom of the block and forming therewith a sample gas manifold communicating with said outlet and with each of the bottoms of said openings, a hood attached to the top of the block and forming therewith a manifold communicating with said exhaust gas port and with each of the tops of said openings, three-way valve structures positioned one in each of said openings and each including a reciprocable head for placing the sample gas inlet of one of said openings in communication with one or the other of said manifolds, and a plurality of solenoids in said hood each having a reciprocable armature connected to one of said heads for actuating it, whereby exhaust gas flows through the hood in heat exchange relation with said solenoids.

5. A multiple sampling valve, comprising an elongate block provided with a plurality of spaced parallel openings extending vertically therethrough and arranged in a line, lateral sample gas inlets communicating one with each of said openings, a lateral sample gas outlet and a lateral sample gas exhaust port; a base attached to the bottom of the block and provided with a channel forming with said block a sample gas manifold communicating with said outlet and with each of the bottoms of said openings, a hood attached to the top of the block and forming therewith a manifold communicating with said exhaust gas port and with each of the tops of said openings, three-way valve structures removably positioned one in each of said openings and retained therein by said base, each of said valves including a reciprocable head for placing the sample gas inlet of one of said openings thereof in communication with one or the other of said manifolds, and a plurality of solenoids in said hood each having a reciprocable armature connected to one of said heads for actuating it, whereby exhaust gas flows through the hood in heat exchange relation with said solenoids.

6. A multiple sampling valve having a plurality of units, a common block for the units provided with an opening extending through it and with an inwardly extending abutment at one end of the opening, the block having a sample gas inlet communicating with said opening between its ends, a three-way valve structure removably positioned in said opening and having a reciprocable double valve head for controlling flow of said inlet selectively through one or the other end of said opening, said valve structure including a three-part housing having a central barrel and a valve seat ring at each end of the barrel cooperating with said double valve head, one of said rings being in engagement with said abutment, annular sealing gaskets between said rings and the ends of said barrel and engaging the wall of said opening, and a retaining member attached to said block and clamping the parts of said valve housing between it and said abutment to retain the valve structure in said opening and to squeeze said gaskets into sealing engagement with the housing parts and the wall of said opening.

7. A multiple sampling valve having a plurality of units, a common block for the units provided with an opening extending through it and with an inwardly extending abutment at one end of the opening, the block having a sample gas inlet communicating with said opening between its ends, a three-way valve structure removably positioned in said opening and including a reciprocable double valve head for controlling flow from said inlet selectively through one or the other end of said opening, said valve structure including a three-part housing having a central barrel and a ring at each end of the barrel provided with a seat for said head, one of said rings being in engagement with said abutment, annular sealing gaskets between said rings and the ends of said barrel and engaging the wall of said opening, a retaining member attached to said block and clamping the parts of said valve housing between it and said abutment to retain the valve structure in said opening and to squeeze said gaskets into sealing engagement with the housing parts and the wall of said opening, and a solenoid attached to said block and having a reciprocable armature connected to said double valve head for moving it alternately into engagement with said ring seats.

JOHN P. STRANGE.
WILLIAM P. YANT.

REFERENCES CITED

The following references are of record in the file of this patent:

UNITED STATES PATENTS

| Number | Name | Date |
| --- | --- | --- |
| 1,277,427 | Knauf | Sept. 3, 1918 |
| 1,533,128 | Meyers | Apr. 14, 1925 |
| 1,649,900 | Holdsworth | Nov. 22, 1927 |
| 1,684,033 | Josephs | Sept. 11, 1928 |
| 2,267,515 | Wilcox | Dec. 23, 1941 |
| 2,288,912 | Mears | July 7, 1942 |
| 2,339,353 | Ray | Jan. 18, 1944 |
| 2,348,827 | Lambert | May 16, 1944 |
| 2,390,425 | Crum | Dec. 4, 1945 |
| 2,425,380 | Livers | Aug. 12, 1947 |